United States Patent [19]
Yamaguchi

[11] Patent Number: 5,638,123
[45] Date of Patent: Jun. 10, 1997

[54] EXPOSURE CONTROL CIRCUIT APPARATUS

[75] Inventor: Masanori Yamaguchi, Kanagawa, Japan

[73] Assignee: Sony Corporation, Japan

[21] Appl. No.: 503,192

[22] Filed: Jul. 17, 1995

Related U.S. Application Data

[63] Continuation of Ser. No. 261,261, Jun. 14, 1994, abandoned.

[30] Foreign Application Priority Data

Jun. 18, 1993 [JP] Japan ........................... 5-147646

[51] Int. Cl.$^6$ ........................ H04N 5/235; H04N 5/335
[52] U.S. Cl. .................... 348/364; 348/230; 348/296; 348/297; 348/362
[58] Field of Search ........................ 348/229, 230, 348/296, 297, 362, 364, 298, 299, 363; 327/77; 375/340; H04N 5/235, 5/335

[56] References Cited

U.S. PATENT DOCUMENTS

| | | | |
|---|---|---|---|
| 3,728,484 | 4/1973 | Hawkey et al. | 375/340 |
| 4,308,502 | 12/1981 | Brolin | 327/77 |
| 4,701,626 | 10/1987 | Ishizaki et al. | 348/297 |
| 4,706,123 | 11/1987 | Chautemps | 348/297 |
| 5,065,248 | 11/1991 | Homma | 348/229 |
| 5,115,319 | 5/1992 | Arai et al. | 348/230 |
| 5,128,769 | 7/1992 | Arai et al. | 348/363 |
| 5,157,502 | 10/1992 | Nakajima et al. | 348/296 |
| 5,299,015 | 3/1994 | Imaide et al. | 348/229 |

*Primary Examiner*—Wendy Garber
*Assistant Examiner*—Andrew B. Christensen
*Attorney, Agent, or Firm*—Ronald P. Kananen

[57] ABSTRACT

There is provided an exposure control circuit apparatus of a structure such that a momentary change of luminance level can be equivalently disregarded, and a response of an iris can be closer to that of the eye of a human being. This exposure control circuit apparatus comprises: a light quantity detecting circuit for detecting a divisional region to which signal level V of average luminance signal belongs of a large number of divisional regions obtained by dividing the range between the maximum level and the minimum level of the signal level V; a response speed setting circuit adapted for setting the degree of change of response speed in dependency upon an output of the light quantity detecting circuit and such that when at least the signal level V of average luminance signal belongs to the region including the maximum level or the region including the minimum level and that signal level is continuously inputted for a predetermined time, the response speed setting circuit sets the degree of change of the response speed to a larger value; and an exposure time control circuit for varying exposure time on the basis of the response speed set at the response speed setting circuit.

17 Claims, 6 Drawing Sheets

FIG.4A

| | |
|---|---|
| VDD | — |
| V1 | 1 |
| V2 | 0 |
| V3 | 0 |
| V4 | 0 |
| GND | 0 |

FIG.4B

| | |
|---|---|
| VDD | — |
| V1 | 0 |
| V2 | 1 |
| V3 | 0 |
| V4 | 0 |
| GND | 0 |

FIG.4C

| | |
|---|---|
| VDD | — |
| V1 | 0 |
| V2 | 0 |
| V3 | 1 |
| V4 | 0 |
| GND | 0 |

1 : HIGH LEVEL
0 : LOW LEVEL

FIG.4D

| | |
|---|---|
| VDD | — |
| V1 | 0 |
| V2 | 0 |
| V3 | 0 |
| V4 | 1 |
| GND | 0 |

FIG.4E

| | |
|---|---|
| VDD | — |
| V1 | 0 |
| V2 | 0 |
| V3 | 0 |
| V4 | 0 |
| GND | 1 |

EXPOSURE CONTROL CIRCUIT APPARATUS

This application is a continuation of application Ser. No. 08/261,261 filed Jun. 14, 1994, now abandoned.

BACKGROUND OF THE INVENTION

1. Field of the Invention

This invention relates to an exposure control circuit apparatus, and more particularly to an exposure control circuit apparatus for detecting an average luminance signal of an image pick-up signal by signal charges stored at a plurality of pixels of a solid-state image pick-up device to apply, to the solid-state image pick-up device, a shutter pulse for allowing respective pixels of the solid-state image pick-up device to discharge signal charges on the basis of the signal level of the detected average luminance signal to thereby control the exposure time at respective pixels of the solid-state image pick-up device.

2. Description of the Related Art

A solid-state image pick-up device, for example, a solid-state image pick-up device composed of pixels for storing an incident light from, e.g., an object as signal charges and a charge transfer section constituted with CCDs for sequentially transferring signal charges from these pixels in a vertical direction or in a horizontal direction is generally of a structure permitting signal charges stored at respective pixels of the solid-state image pick-up device to be swept away into the overflow drain region or the semiconductor substrate side by application of a shutter pulse.

In a solid-state image pick-up device of the field readout type in conformity with, e.g., the NTSC system, charge storage time at pixels within the field period is adjusted by application of the shutter pulse, thereby permitting the exposure time to be adjustable. Control of the exposure time is ordinarily called an electronic shutter function.

The control of the exposure time by the shutter pulse is carried out in units of 1H (horizontal scanning period) at least at the vertical scanning period in the case of the field readout type as described above. The reason why application timing of the shutter pulse is limited within the horizontal scanning period is to avoid noise being mixed into an image pick-up signal within the vertical scanning period.

However, since there is no need to fear that any noise will be mixed into an image pick-up signal within the vertical blanking period, control is carried out in time units considerably shorter than 1H.

Among video cameras using such solid-state image pick-up devices, there are some video cameras in which electronic shutter function is utilized for the iris control. Generally, a video camera comprises, as shown in FIG. 1, an imaging section composed of a lens 1 and a solid-state image pick-up device 2, a sample-hold circuit (hereinafter referred to as a S/H circuit) 3 for taking out an image pick-up signal S from an output from the solid-state image pick-up device 2 in the imaging section, an AGC (Automatic Gain Control) circuit 4, a gamma correction circuit 5, and a signal processing section composed of a white clipping circuit 6 and a black clipping circuit 7.

A video camera as mentioned above conventionally includes therein an exposure control circuit utilizing the electronic shutter function for the iris (stop) control. This exposure control circuit comprises, as shown in FIG. 1, a low-pass filter 8 for integrating image pick-up signals S from the S/H circuit 3, and a shutter control circuit 9.

More particularly, the low-pass filter 8 serves to detect the overall (average) brightness of picture (pictorial image of an object) by integrating the image pick-up signals S from the S/H circuit 3. The shutter control circuit 9 is basically constructed as a circuit for applying a shutter pulse signal to solid-state image pick-up device 2 in a manner to allow it to be in synchronism with a horizontal synchronizing signal within the vertical scanning period in a vertical synchronizing signal, and particularly serves to control the time from occurrence time point of the last shutter pulse up to occurrence time point of a subsequent readout pulse, i.e., exposure time by setting the number of output pulses of the shutter pulse signal applied to the solid-state image pick-up device 2 in accordance with the signal level of an output signal from the low-pass filter 8.

The shutter control circuit 9 performs, e.g., a function such that in the case where the signal level of an output signal from low-pass filter 8 is higher than reference level (i.e., an incident light is bright), the shutter speed is caused to be higher (the exposure time is shortened), while in the case opposite to the above (i.e., an incident light is dark), the shutter speed is caused to be lower (the exposure time is prolonged).

In this case, the above-mentioned readout pulse is a pulse signal for reading out signal charges stored at respective pixels of the solid-state image pick-up device 2. This readout pulse is outputted in the state superimposed on, e.g., pulse of the first phase of vertical transfer pulse signal of polyphase for vertically transferring signal charges stored at respective pixels.

It should be noted that there is employed in recent years a technique for permitting a shutter pulse signal having a period shorter than 1H to be generated at the vertical blanking period. The reason why such a technique is employed is to permit the brightness to be more finely adjusted so that the dynamic range of the exposure (iris) control is expanded.

In such conventional exposure control circuit, an exposure (iris) control is carried out such that when the signal level of an output signal from low-pass filter 8 is higher than reference level, the exposure time is shortened by one horizontal period (1H) every field so that the signal level of the output signal from low-pass filter 8 reaches the reference level, while when the signal level of an output signal from low-pass filter 8 is lower than the reference level, the exposure time is prolonged by one horizontal period (1H) every field so that the signal level of the output signal from low-pass filter 8 reaches the reference level.

Namely, the conventional exposure control circuit carries out an exposure control to recognize from an image pick-up signal S delivered from S/H circuit 3, whether a picture (pictorial image of an object) is bright, optimum or dark. It then adjusts the shutter speed to a higher level when the picture is bright, adjusts the shutter speed to be a lower level when the picture is dark and terminates the control operation when the current brightness is optimum.

However, in the conventional exposure control circuit, there is the following problem.

Namely, in the case where there takes place a momentary luminance change when a pedestrian passes in front of the video camera, or the like, the iris immediately responds thereto (i.e., exposure time immediately changes), so the luminance level of picture changes. As a result, the picture becomes very difficult to see. On the other hand, in the case of the eye of the human being, there is no possibility that brightness of the entirety changes even if a momentary luminance change as described above takes place.

To solve the above-mentioned problem, the following measure was taken in the related art in the exposure control circuit shown in FIG. 1, for example. Namely, the time constant of low-pass filter 8 for carrying out luminance detection is prolonged to allow change of luminance level to be dull to cause the change between three states (iris response) to be gentle even if a sudden change of luminance level takes place.

However, in this method, there takes place new problem that the iris response becomes dull even if a great change of luminance level which is not momentary takes place, thereby restricting the response speed.

OBJECT AND SUMMARY OF THE INVENTION

An object of this invention is to provide an exposure control circuit apparatus which can equivalently disregard momentary change of luminance level, and can allow response of iris to be faster as change of luminance level which is not momentary becomes greater, thus making it possible to realize an iris response closer to that of the eye of the human being.

To achieve the above-mentioned object, in accordance with this invention, there is provided an exposure control circuit apparatus adapted for detecting signal level V of an average luminance signal Sy obtained after image pick-up signal S is caused to undergo luminance detection to control an exposure time T of the basis of the detected signal level V, comprising: light quantity detecting means for detecting a divisional region to which the signal level V of the average luminance signal Sy belongs of a large number of divisional regions obtained by dividing the range between maximum level $V_{DD}$ and minimum level $V_{SS}$ of the signal level V of the average luminance signal Sy; response speed setting means adapted to set the degree of change of response speed in dependency upon an output of the light quantity detecting means and such that when at least the signal level of the average luminance signal Sy belongs to the region including the maximum level $V_{DD}$ or the region including the minimum level $V_{SS}$ and that signal level V is continuously inputted for a predetermined time, the response speed setting means sets the degree of change of the response speed to a larger value; and exposure time control means for changing the exposure time T on the basis of the response speed set at the response speed setting means.

In this case, the above-mentioned image pick-up signal S may be signal-by-signal charges which are stored in a plurality of pixels of a solid-state image pick-up device within exposure time T. The charges are then read out into a charge transfer section at the time of the application of a readout pulse ROG, and are further sequentially transferred by the charge transfer section. The exposure control means may include means for controlling exposure times T at respective pixels of the solid-state image pick-up device by applying, to solid-state image pick-up device, a shutter pulse Ps for discharging the signal charges stored at respective pixels of the solid-state image pick-up device.

In this invention, the above-mentioned light quantity detecting means may include a plurality of comparators 14a~14d for comparing reference levels V1~V4 different from each other with a signal level V of an average luminance signal Sy. Further, the response speed setting means may include the following means. Namely, the response speed setting means may be composed of detecting means for detecting information relating to the divisional region on the basis of outputs from a plurality of comparators 14a~14d; information holding means for taking in at, every predetermined period information relating to the divisional region detected by the detecting means and holding it for a predetermined period; maximum level detecting means such that when the information relating to the divisional region held by the information holding means belongs to the region including maximum level $V_{DD}$, set operation is carried out, and when set operations are continuously carried out a predetermined number of times, an output signal is outputted; minimum level detecting means such that when the information relating to the divisional region held by the information holding means belongs to the region including minimum level $V_{SS}$, a set operation is carried out, and when set operations are continuously carried out a predetermined number of times, an output signal is outputted; and adding/subtracting means adapted to set the degree of change of a response speed corresponding to the information held by the information holding means, and to set the degree of change to a larger value on the basis of input of an output signal from the maximum level detecting means or the minimum level detecting means.

In this case, the information holding means may be of a structure to take thereinto information relating to a divisional region detected at detecting means every input of readout pulse ROG to hold it for a time period corresponding to a pulse period of readout pulse ROG. Further, the maximum level detecting means and the minimum level detecting means may be of a multi-stage structure including flip-flop circuits of the number of stages obtained by subtracting 1 from the predetermined number of times which is the number of times of the set operations.

In the exposure control circuit apparatus according to this invention, at light quantity detecting means, a divisional region to which signal level V of average luminance signal Sy obtained after image pick-up signal S is caused to undergo luminance detection belongs of a large number of divisional regions obtained by dividing the range between maximum level $V_{DD}$ and minimum level $V_{SS}$ is first detected.

Thereafter, at response speed setting means, response speed corresponding to the divisional region detected by light quantity detecting means is set. Particularly, in this response speed setting means, in the case where at least signal level V of average luminance signal Sy belongs to the region including maximum level $V_{DD}$ or the region including minimum level $V_{SS}$ and that signal level V is continuously inputted for a predetermined time, the degree of change of the response speed is set to a larger value.

Namely, in the case where luminance level is momentarily varied too much, there is no possibility that average luminance signal Sy having signal level V belonging to the region including maximum level $V_{DD}$ or the region including minimum level $V_{SS}$ is continuously inputted to response speed setting means for a predetermined time. For this reason, there is no possibility that the degree of change of response speed is set to a larger value.

On the other hand, in the case where there takes place any great change of luminance level which is not momentary, average luminance signal Sy having signal level V belonging to the region including maximum level D or the region including minimum level $V_{SS}$ is continuously inputted to response speed setting means for a predetermined time. For this reason, the degree of change of the response speed is set to a larger value.

As stated above, in the exposure control circuit apparatus according to this invention, momentary change of luminance level can be equivalently disregarded. In addition, with respect to change of luminance level which is not momentary, response of iris is permitted to be faster according as that level change becomes greater. Thus, iris response closer to that of the eye of the human being can be realized.

BRIEF DESCRIPTION OF THE DRAWINGS

FIGS. 4A to 4E are explanatory views showing signal processing at light quantity detecting circuit and the contents of output data train of decoder based on outputs from respective comparators constituting the light quantity detecting circuit in the exposure control circuit according to this embodiment.

DETAILED DESCRIPTION OF THE PREFERRED EMBODIMENTS

An embodiment in which an exposure control circuit apparatus according to the invention is applied to an exposure control circuit for a video camera using solid-state image pick-up device of the field readout type (hereinafter simply referred to as an exposure control circuit according to the embodiment) is hereinafter described with reference to FIGS. 2 to 6.

Figure 1:
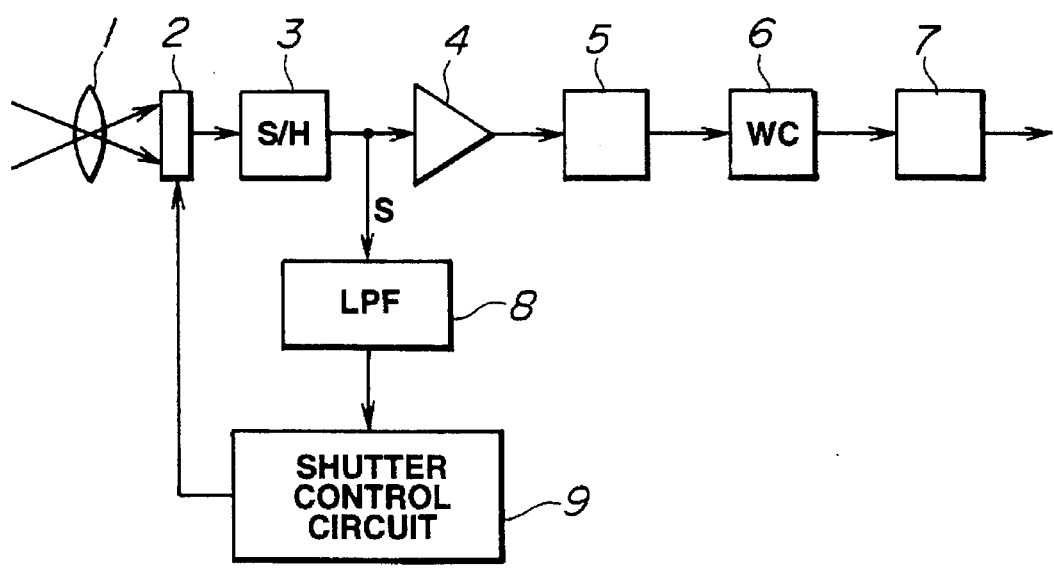
FIG. 1 is a block diagram showing an exposure control circuit for a video camera according to the related art.
Figure 2:
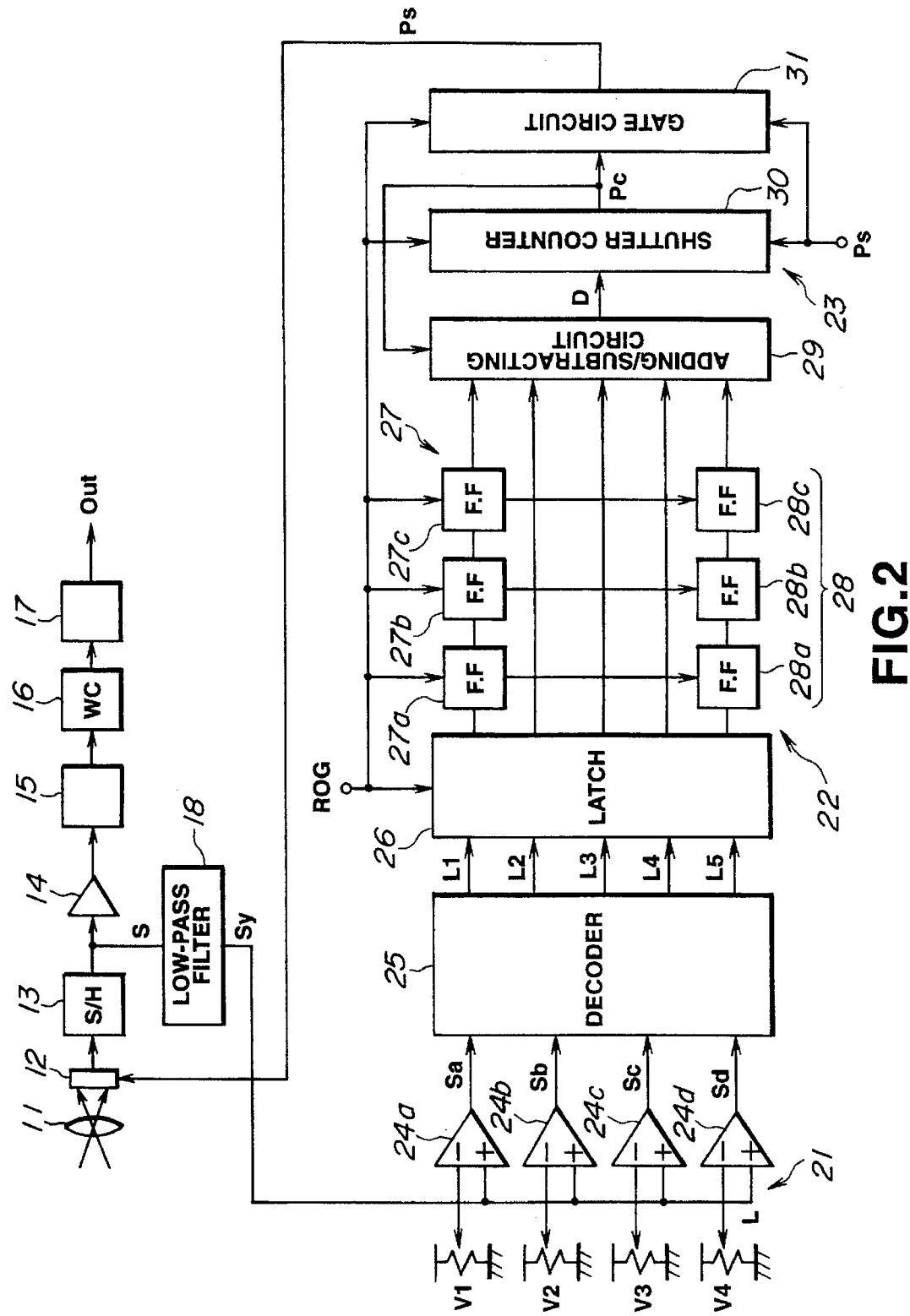
FIG. 2 is a block diagram showing the configuration of an embodiment of the invention in which an exposure control circuit apparatus is applied to an exposure control circuit for a video camera in which a solid-state image pick-up device of the field readout type is used (hereinafter simply referred to as exposure control circuit of the embodiment).

The basic configuration of a video camera to which the exposure control circuit apparatus according to this invention is applied, comprises; as shown in FIG. 2, an imaging section composed of a lens 11 and a solid-state image pick-up device 12, a sample-hold circuit (hereinafter referred to as a S/H circuit) 13 for taking out an image pick-up signal S from an output from solid-state image pick-up device 12 in the imaging section, an AGC circuit 14, a gamma correction circuit 15, and a signal processing section comprising a white clipping circuit 18 and a black clipping circuit 17. To the succeeding stage of S/H circuit 13, a low-pass filter 18 for integrating image pick-up signals S from the S/H circuit 13 to obtain an average luminance signal of, e.g., one field (hereinafter referred to as average luminance signal) Sy is connected.

The exposure control circuit according to this embodiment includes a light quantity detecting circuit 21 for electrically detecting on the basis of the signal level V of an average luminance signal Sy from the low-pass filter 18 to what degree brightness of an incident light of an imaged object is. It also includes a response speed setting circuit 22 for setting the degree of change of response speed in accordance with an output of the light quantity detecting circuit 21, and an exposure time control circuit 23 for varying exposure time on the basis of response speed set at the response speed setting circuit 22.

More specifically, the light quantity detecting circuit 21 is composed of four comparators (first to fourth comparators) 24a~24d. Respective comparators 24a~24d have non-inverting input terminals supplied with average luminance signal Sy from low-pass filter 18, and inverting input terminals to which reference voltages V1~V4 having levels different from each other are applied. Accordingly, it is possible to detect a grade where signal level V of an average luminance signal Sy from low-pass filter 18 exists of five grades by outputs from these comparators 24a~24d.

Figure 3:
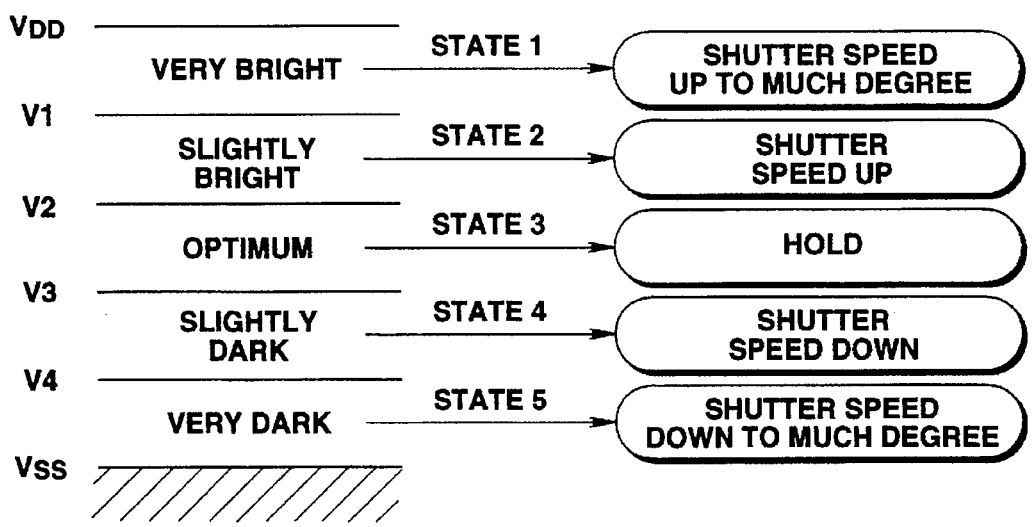
FIG. 3 is an explanatory view showing the concept of operation for detecting a divisional region to which signal level of an inputted average luminance signal belongs of five divisional regions ((1) very bright: state 1, (2) bright: state 2, (3) optimum: state 3, (4) dark: state 4, (5) very dark: state 5) in light quantity detecting circuit of the exposure control circuit according to this embodiment.

Namely, as shown in FIG. 3, the range between maximum level $V_{DD}$ and minimum level $V_{SS}$ in the signal level V of the average luminance signal Sy from low-pass filter 18 is divided into five regions (state 1~state 5) in dependency upon outputs from respective comparators 24a~24d. Accordingly, it is possible to detect divisional region to which signal level V of average luminance signal Sy inputted to light quantity detecting circuit 21 belongs of the five divisional regions. Namely, from the signal level V of the average luminance signal Sy, it is possible to classify brightness in a manner of (1) very bright, (2) bright, (3) optimum, (4) dark, and (5) very dark.

Turning back to FIG. 2, the response speed setting circuit 22 comprises a decoder 25 having four input terminals and five output terminals, a latch circuit 26 having five input terminals and five output terminals, and an adding/subtracting circuit 29 having five input terminals. Output signals Sa~Sd from the first to fourth comparators 24a~24d in the light quantity detecting circuit 21 are inputted to respective input terminals of decoder 25. This decoder 25 converts respective output signals Sa~Sd of the first to fourth comparators 24a~24d, which are inputted thereto, into data trains corresponding to combinations of respective signal levels thereof to output them from five output terminals in parallel. Data trains from decoder 25 are respectively inputted to latch circuit 26 of the succeeding stage in parallel through five output lines (first to fifth output lines) L1~L5.

The latch circuit 26 serves to take thereinto data trains from decoder 25 of the preceding stage every field on the basis of input of readout pulse ROG in the solid-state image pick-up device 12 to output in parallel, from five output terminals, the data trains which have been taken thereinto from the five output terminals of the decoder 25.

Figure 5A:
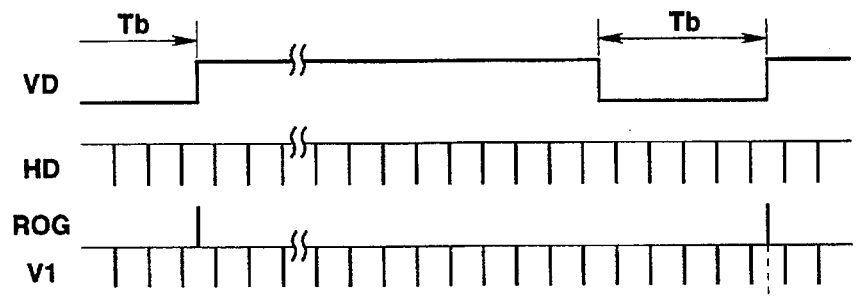
FIGS. 5A and 5C are timing charts showing signal processing operation of the exposure control circuit (adjustable operation of exposure time) according to the embodiment wherein signal processing with respect to ordinary level change is shown.
Figure 6A:
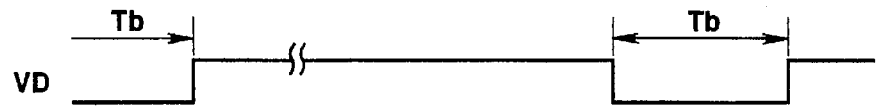
FIGS. 6A to 6C are timing charts showing signal processing operation of the exposure control circuit (adjustable operation of the exposure time) according to the embodiment wherein signal processing in the case where luminance level varies to a great much degree is shown.

In this example, readout pulse ROG is a pulse signal for reading out signal charges stored at respective pixels of the solid-state image pick-up device 12. As shown in FIGS. 5A and 6A, this pulse signal is outputted in the state superimposed on, e.g., pulse of the first phase V1 of a vertical transfer pulse signal of polyphase for vertically transferring the signal charges stored at respective pixels.

The data trains which have been taken into the latch circuit 26 are held at the latch circuit 26 until input of the subsequent readout pulse ROG is provided. From five output terminals of the latch circuit 26, five output lines corresponding to output lines L1~L5 drawn from the decoder 25 are drawn.

A maximum level detecting circuit 27 is connected to the output line corresponding to the first output line L1

(hereinafter simply referred to as state 1 line) of decoder 25 of the output lines drawn from the latch circuit 26, and a minimum level detecting circuit 28 is connected to the output line corresponding to the fifth output line L5 (hereinafter simply referred to as state 5 line) of decoder 25. The maximum level detecting circuit 27 is comprised of three stages of flip-flop circuits (first to third flip-flop circuits) 27a~27c connected in series. Further, the minimum level detecting circuit 28 is comprised of three stages of flip-flop circuits (first to third flip-flop circuits) 28a~28c connected in series.

Respective flip-flop circuits (27a~27c) and (28a~28c) are adapted so that readout pulse ROG is inputted to their clock terminals. When an input is high at the time that the readout pulse ROG is inputted, these flip-flop circuits respectively output signals of high level to the next flip-flop circuits.

For example, in the case where the state 1 line of latch circuit 26 is caused to be at high level by data train which has been taken into latch circuit 26 at the time of input of readout pulse ROG thereto, and the state 1 line still remains at high level at the time of input of the subsequent readout pulse (second readout pulse), a high level is outputted from first flip-flop circuit 27a in the maximum level detecting circuit 2, and this signal is inputted to second flip-flop circuit 27b of the succeeding stage.

In the case where the state 1 line of latch circuit 26 is at a high level for a second time at the time of input of the subsequent readout pulse (third readout pulse), a high level is outputted from the second flip-flop circuit 27b, and this signal is inputted to the third flip-flop circuit 27c of the succeeding stage. In the case where state 1 line of latch circuit 26 still remains at a high level at the time of input of the subsequent readout pulse (fourth readout pulse), a high level is outputted from third flip-flop circuit 27c.

In the case where the state 1 line of latch circuit 28 is caused to be low at the time of any one of a second, a third and, a fourth readout pulses, a low level is outputted from a third flip-flop circuit 27c. Accordingly, a high level is not outputted from the third flip-flop circuit 27c until the state 1 line is caused to be continuously at a high level every inputs of the four readout pulses.

This operation is the same in the minimum level detecting circuit 28. A signal of high level is not outputted from a third flip-flop circuit 28c until the state 5 line is caused to be continuously at high level for every input of the four readout pulses.

The adding/subtracting circuit 29 has five input terminals, and is of a structure such that an output from the maximum level detecting circuit 27 is inputted to the first input terminal, an output from the minimum level detecting circuit 28 is inputted to the fifth input terminal, and output lines corresponding to second to fourth output lines (hereinafter respectively simply referred to as state 2 line, state 3 line and state 4 line) in the latch circuit 28 are respectively connected to other input terminals, i.e., second to fourth input terminals.

In the adding/subtracting circuit 29, the number of current electronic shutter pulses is stored as data (shutter pulse data). This adding/subtracting circuit 29 implements additive/ subtractive processing to the data by combinations of high and low levels of signals delivered to respective input terminals, thus to determine the number of shutter pulses in the next field.

More particularly, when a signal of high level is inputted to the first input terminal corresponding to the state 1 line of latch circuit 26, a numeric value 5 is added (+5) to the current shutter pulse data. In the case where a signal of high level is inputted to the second input terminal corresponding to the state 2 line of latch circuit 26, a numeric value 1 is added (+1) to the current shutter pulse data. In addition, in the case where a signal of high level is inputted to the third input terminal corresponding to the state 3 line of latch circuit 26, the current shutter pulse data is held.

In the case where a signal of high level is inputted to the fourth input terminal corresponds to the state 4 line of the latch circuit 26, numeric value 1 is subtracted (−1) from current shutter pulse data. In the case where a signal of high level is inputted to the fifth input terminal corresponding to the state 5 line of the latch circuit 26, a numeric value 5 is subtracted (−5) from current shutter pulse data. It is to be noted that in the case where signals of low level are inputted to all the first to fifth input terminals, current shutter pulse data is held.

The shutter pulse data D which has been caused to undergo additive/subtractive processing is outputted to shutter counter 30 on the basis of input of carry signal Pc from shutter counter 30 in exposure time control circuit 23 which will be described soon.

The exposure time control circuit 23 is composed of a shutter counter 30 connected to the succeeding stage of the adding/subtracting circuit 29, and a gate circuit 31 connected to the succeeding stage of the shutter counter 30.

This shutter counter 30 counts shutter pulses Ps by the number of pulses indicated by shutter pulse data D from the adding/subtracting circuit 29 on the basis of inputs of readout pulses ROG generated every field to deliver, when that number has been counted, a carry signal Pc to a gate circuit 31 of the succeeding stage and an adding/subtracting circuit 29 of the preceding stage.

The gate circuit 31 is a circuit adapted for gating shutter pulse Ps to send it to the solid-state image pick-up device 12, i.e., opens the gate on the basis of inputs of readout pulses ROG generated every field and closes the gate on the basis of input of carry signal Pc from shutter counter 30. Accordingly, for a time period until carry signal Pc is inputted after the readout pulse ROG is inputted, shutter pulse Ps is outputted from the gate circuit 31 to the solid-state image pick-up device 12.

The signal processing operation of the exposure control circuit according to the embodiment will now be described with reference to the explanatory view of FIG. 4 and the timing charts of FIGS. 5 and 6. It is to be noted that, in the timing charts of FIGS. 5 and 6, VD and HD in FIGS. 5A and 6A respectively indicate a vertical synchronizing signal and a horizontal synchronizing signal, and Tb in the vertical synchronizing signal indicates a vertical blanking period.

First, image pick-up signals S sampled and held by S/H circuit 13 are integrated by low-pass filter 18 so that they are converted into an average luminance signal Sy of one field. This signal Sy is nothing but a signal indicating an overall (average) brightness of picture of one field.

The average luminance signal Sy from the low-pass filter 18 is delivered to light quantity detecting circuit 21 of the exposure control circuit according to this embodiment. The light quantity detecting circuit 21 detects, from the average luminance signal Sy delivered thereto, a stage to which current brightness belongs of five stages. In more practical sense, it is now assumed that the maximum level of output from low-pass filter 18 is $V_{DD}$ and the minimum level thereof is $V_{SS}$, and reference levels of first to fourth comparators 24a~24d are respectively V1, V2, V3 and V4 ($V1 > V2 > V3 > V4$). On this assumption, if the signal level of the average luminance signal Sy is within the range expressed as $V_{DD} \geq V > V1$, it is detected that (1) the picture is very bright; if the signal level V of average luminance signal Sy is within the range expressed as $V1 \geq V > V2$, it is detected that (2) the picture is bright; if the signal level V of average luminance signal Sy is within the range expressed as $V2 \geq V > V3$, it is detected that (3) the brightness is optimum; if the signal level V of average luminance signal Sy is within the range expressed as $V3 \geq V > V4$, it is detected that (4) the picture is dark; and if the signal level V of average luminance signal Sy is within the range expressed as $V4 \geq V > V_{SS}$, it is detected that (5) the picture is very dark.

Now in the case where the signal level V of average luminance signal Sy inputted to the light quantity detecting circuit 21 is within the range expressed as $V_{DD} \geq V > V1$ as shown in FIG. 4A, for example, output signals Sa~Sd outputted from the first to fourth comparators 24a~24d are caused to be all at a high level. At this time, a data train in which only the first output line L1 is caused to be at a high level is outputted from the decoder 25. This data train is taken into the latch circuit 26 by the input of a readout pulse ROG to the latch circuit 26, at which that data train is held for one field period.

In the case where the signal level V of an average luminance signal Sy is within the range expressed as $V1 \geq V > V2$ as shown in FIG. 4B, only a signal Sa outputted from first comparator 24a is caused to be at a low level and signals Sb~Sd outputted from the remaining three comparators 24b~24d are caused to be at a high level. At this time, data train in which only a second output line L2 is caused to be at a high level is outputted from the decoder 25. This data train is taken into the latch circuit 26 by input of readout pulse ROG to the latch circuit 26, at which that data train is held for one field period.

In the case where the signal level V of average luminance signal Sy is within the range expressed as $V2 \geq V > V3$ as shown in FIG. 4C, signals Sa and Sb outputted from the first and second comparators 24a and 24b are caused to be at low level, and signals Sc and Sd outputted from the remaining two comparators 24c and 24d are caused to be at a high level. At this time, data train in which only the third output line L3 is caused to be at a high level is outputted from the decoder 25. This data train is taken into the latch circuit 26 by input of readout pulse ROG to the latch circuit 26, at which that data train is held for one field period.

In the case where the signal level V of average luminance signal Sy is within the range expressed as $V3 \geq V > V4$ as shown in FIG. 4D, only a signal Sd outputted from fourth comparator 24d is caused to be at a high level, and the signals Sa to Sc outputted from the remaining three comparators 24a to 24c are caused to be all at a low level. At this time, the data train in which only the fourth output line L4 is caused to be at a high level is outputted from the decoder 25. This data train is taken into the latch circuit 26 by input of a readout pulse ROG to the latch circuit 26, at which that data train is held for one field period.

In the case where the signal level V of average luminance signal Sy is within the range expressed as $V4 \geq V \geq V_{SS}$ as shown in FIG. 4E, output signals Sa~Sd outputted from respective comparators 24a~24d are caused to be all at a low level. At this time, the data train in which the only fifth output line L5 is caused to be at a high level is outputted from the decoder 25. This data train is taken into the latch circuit 28 by input of readout pulse ROG to the latch circuit 28, at which that data train is held for one field period.

In the case where the data train in which only the first output line L1 is caused to be at a high level is delivered to the latch circuit 26, a signal of high level is delivered from the first flip-flop circuit 27a to the second flip-flop circuit 27b of the succeeding stage in the maximum level detecting circuit 2 by input of readout pulse ROG in the next one field. Further, in the case where data train in which only the fifth output line L5 is caused to be at a high level is delivered to the latch circuit 26, a signal of a high level is delivered from the first flip-flop circuit 28a to the second flip-flop circuit 28b of the succeeding stage in the minimum level detecting circuit 28.

In the case where data train in which any one of second, third and fourth output lines L2, L3 and L4 is caused to be at a high level is delivered to the latch circuit 26, this data train is directly delivered to the adding/subtracting circuit 29.

Figure 5B:
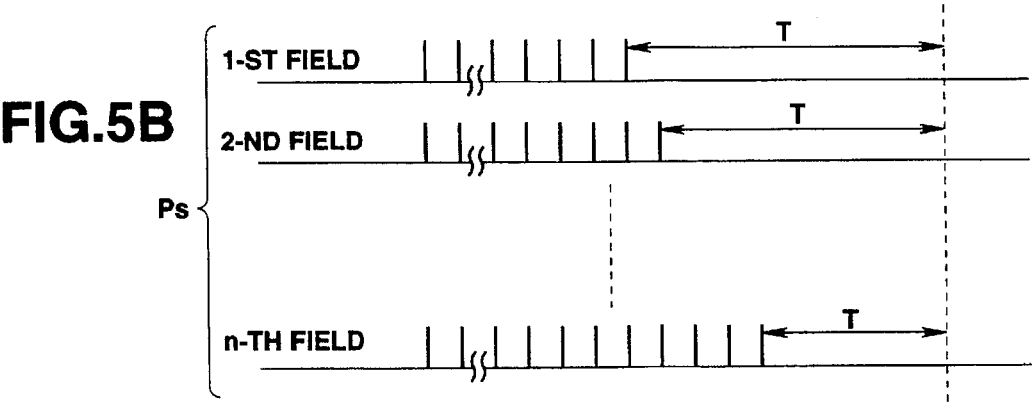

Now in the case where the signal level V of average luminance signal Sy falls within the range expressed as $V1 \geq V > V2$ at the stage where, e.g., the first field is read out as shown in FIG. 5B and it is detected that picture is bright, and data train in which only the second output line L2 is caused to be at a high level, which has been outputted from decoder 25, is inputted to the adding/subtracting circuit 29, the numeric value 1 is added (+1) to the current shutter pulse data D. On the basis of the input of carry signal Pc from shutter counter 30, the additively updated data D is delivered to shutter counter 30. Accordingly, shutter pulse Ps of the number of pulses that the additively updated data D indicates is sent from gate circuit 31 to the solid-state image pick-up device 12 in the next field (second field). Thus, exposure time T of the solid-state image pick-up device 12 is shortened by one period of the shutter pulse. Namely, there equivalently results the state where iris is closed to a predetermined degree.

When brightness becomes an ordinary value by repeating such operations, the signal level V of average luminance signal Sy falls within the range expressed as $V2 \geq V > V3$. In this case, data train in which only the third output line L3 is caused to be at high level is inputted to adding/subtracting circuit 29. As a result, current shutter pulse data D is held as it is. Thus, the data D thus held is delivered to shutter counter 30 on the basis of an input of a carry signal Pc from shutter counter 30. Accordingly, the exposure time T is not changed.

Figure 5C:
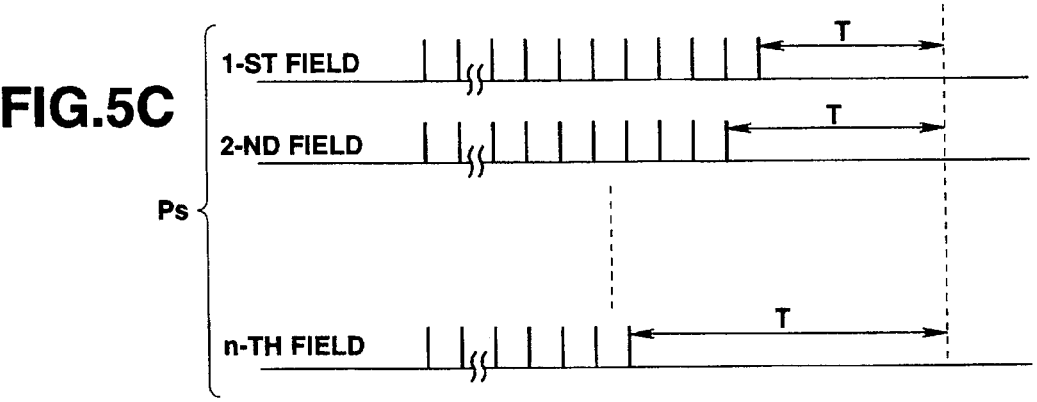

On the other hand, in the case where the signal level V of average luminance signal Sy falls within the range expressed as $V3 \geq V > V4$ at the stage where, e.g., the first field is read out as shown in FIG. 5C and it is detected that (1) picture is dark, and data train in which only the fourth output line L4 is caused to be at a high level, which has been outputted from the decoder 25, is inputted to the adding/subtracting circuit 29, a numeric value 1 is subtracted (−1) from current shutter pulse data D. On the basis of input of carry signal Pc from shutter counter 30, the subtractively updated data D is delivered to the shutter counter 30. Accordingly, a shutter pulse Ps of the number of pulses that the subtractively updated data D indicates is sent from gate circuit 31 to the solid-state image pick-up device 12 in the next field (second field). Thus, exposure time T of solid-state image pick-up device 12 is prolonged by one period of the shutter pulse. Namely, there equivalently results the state where iris is opened to a predetermined degree.

When brightness becomes an ordinary value by repeating such operations, the signal level V of average luminance signal Sy falls within the range expressed as $V2 \geq V > V3$. Thus, the exposure time T is not changed.

Figure 6B:
Figure 6C:
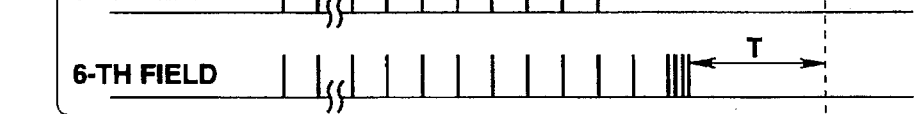

In the case where the signal level V of average luminance signal Sy falls within the range expressed as $V_{DD} \geq V > V1$ at the stage where, e.g., the first field is read out as shown in FIG. 6B and it is therefore detected that (1) the picture is very bright, and, the data train in which only the first output line L1 is caused to be at a high level is outputted from decoder 25, the data train in which data are caused to be all at once at low level is delivered to the adding/subtracting circuit 29 of the succeeding stage. In this case, the adding/ subtracting circuit 29 holds current shutter pulse data as it is. As a result, the exposure time T is not changed. When such a state is continued by 4 fields, a signal of high level is outputted from the third flip-flop circuit 27c of the final stage in the maximum level detecting circuit 27. As a result, a signal in which only the state 1 line is caused to be substantially at a high level is inputted to adding/subtracting circuit In this case, the adding/subtracting circuit 29 adds numeric value 5 (+5) to current shutter pulse data D to deliver the greatly additively updated shutter pulse data D to shutter counter 30 on the basis of input of carry signal Pc from shutter counter 30. Accordingly, shutter pulse of the number of pulses that the greatly additively updated data D indicates is sent from gate circuit 31 to solid-state image pick-up device 12 in the next field (fifth field). Thus, the exposure time T of solid-state image pick-up device 12 is shortened by a time five times greater than the period of the shutter pulse. Namely, there results a shutter speed corresponding to the state where the iris is closed to a degree five times greater than that in the case of ordinary (optimum) brightness.

When a signal of high level is once outputted from the third flip-flop circuit 27c of the final stage in the maximum level detecting circuit 27, in the case where it is detected on the basis of signal level V of an average luminance signal subsequently inputted that picture is very bright, the exposure time T is shortened by a time five times greater than the shutter pulse period every field.

Accordingly, the picture immediately becomes dark. When the signal level V of the average luminance signal Sy falls within the range expressed as $V1 \geq V > V2$, the speed of exposure time T is switched to ordinary speed. As a result, the picture further becomes dark. At the stage where the signal level V of the average luminance signal Sy falls within the range expressed as $V2 \geq V > V3$, there results no change of exposure time T. It is to be noted that since there is no necessity of fearing that any noise may be mixed into image pick-up signal S within the vertical blanking period Tb, output of shutter pulse Ps is provided in units of time considerably shorter than the horizontal scanning period (1H).

On the other hand, in the case where the signal level V of average luminance signal Sy falls within the range expressed as $V4 \geq V > V_{SS}$ at the stage where, e.g., the first field is read out and it is detected that picture is very dark, and data train in which only the fifth outline L5 is caused to be at high level is outputted from decoder 25, the data train in which data are caused to be all at or low level is delivered to the adding/ subtracting circuit 29 of the succeeding stage. In this case, the adding/subtracting circuit 29 holds the current shutter pulse data D as it is. As a result, the exposure time T is not changed. When such state is continued by 4 fields, a signal of high level is outputted from the third flip-flop circuit 28c of the final stage in the minimum level detecting circuit 28. Thus, a signal in which only the state 5 line is caused to be substantially at a high level is inputted to the adding/ subtracting circuit 29.

In this case, the adding/subtracting circuit 29 subtracts numeric value 5 (−5) from current shutter pulse data D to deliver the greatly subtractively updated shutter pulse data D to shutter counter 30 on the basis of input of carry signal Pc from the shutter counter 30. Accordingly, shutter pulse Ps of the number of pulses that the greatly subtractively updated data D indicates is sent from gate circuit 31 to the solid-state image pick-up device 12 in the next field (fifth field). Thus, exposure time T of the solid-state image pick-up device 12 is prolonged by a time five times greater than the period of shutter pulse. Namely, there results a shutter speed corresponding to the state where iris is opened to a degree five times greater than that in the case of ordinary (optimum) brightness.

Also in this example, when a signal of a high level is once outputted from the third flip-flop circuit 28c of the final stage in the minimum level detecting circuit 28, in the case where it is detected on the basis of the signal level V of average luminance signal Sy subsequently inputted that (1) picture is very dark, the exposure time T is prolonged by a time five times greater than the period of shutter pulse every field.

Accordingly, the picture immediately becomes bright. When the signal level V of the average luminance signal Sy falls within the range expressed as $V3 \geq V > 4$, change speed of exposure time T is switched to ordinary change speed. As a result, the picture further becomes bright. At the stage where the signal level V of average luminance signal Sy falls within the range expressed as $V2 \geq V > V3$, there results no change of exposure time T.

As stated above, in the exposure control circuit according to this embodiment, at light quantity detecting circuit 21, there is detected a divisional region to which signal level V of average luminance signal Sy obtained after image pick-up signal S is caused to undergo luminance detection by low-pass filter 18 belongs of five divisional regions ((1) very bright: state 1, (2) bright: state 2; (3) optimum: state 3 (4) dark: state 4, (5) very dark: state 5) obtained by dividing the range between maximum level $V_{DD}$ and minimum level $V_{SS}$. Thereafter, in the response speed setting circuit 22, a response speed corresponding to the divisional region detected at the light quantity detecting circuit 21 is set.

Particularly, in the response speed setting circuit 22 in this embodiment, when a signal level V of average luminance signal Sy falls within the range expressed as $V_{DD} \geq V > V1$ and it is detected that picture is very bright, or when the signal level V falls within the range expressed as $V4 \geq V \geq V_{SS}$ and it is detected that picture is very dark, and the signal level V is continuously inputted by four fields, the degree of change of response speed is set to a larger value. For this reason, in the case where the luminance level momentarily changes to a high degree, there is no possibility that average luminance signal Sy having a signal level in the range of $V_{DD} \geq V > V1$ or in the range of $V4 \geq V > V_{SS}$ is continuously inputted to the response speed setting circuit 22 by four fields. Accordingly, there is no possibility that the degree of change of the response speed is set to a larger value.

On the other hand, in a great change of luminance level which is not momentary, average luminance signal Sy having a signal level V in the range of $V_{DD} \geq V \geq V1$, or in the range of $V4 \geq V \geq V_{SS}$ is continuously inputted to response speed setting circuit 22 by four fields. Thus, the degree of change of response speed is set to a larger value.

As stated above, in the exposure control circuit according to this embodiment, momentary change of luminance level can be equivalently disregarded. In addition, with respect to change of luminance level which is not momentary, response of iris can be faster according as the level change becomes greater. Thus, iris response closer to that of the eye of the human being can be realized.

While, in the above-described embodiment, the numbers of stages of flip-flop circuits in the maximum level detecting circuit 27 and the minimum level detecting circuit 28 are respectively set to 3, those numbers of stages can be arbitrarily determined in dependency upon the degree of momentary luminance change to be actually controlled.

Further, while, in the above-described embodiment, in the case where it is detected at light quantity detecting circuit 21 that (1) picture is very bright and a signal of high level is delivered to the first terminal of adding/subtracting circuit 29, a numeric value 5 is added to current shutter pulse data D, while in the case where it is detected at light quantity detecting circuit 21 that (5) picture is very dark and a signal of high level is delivered to the fifth input terminal of adding/subtracting circuit 29, a numeric value 5 is subtracted from current shutter pulse data, a numeric value to be added or subtracted may be arbitrarily determined.

While, in the above-described embodiment, there is employed evaluation method in which the light quantity is divided into five stages, it is not necessarily required that the evaluation method is limited to such a method, but there may be employed an evaluation method in which the light quantity is divided into more than five stages, for example. Accordingly, in that case, also with respect to response, in place of the method of carrying out switching between two stages as in the above-described embodiment, there may be employed a method of carrying out switching between a larger stages such as three stages, four stages, etc., thereby making it possible to more finely vary the exposure time.

As described above, in accordance with this invention, there is provided exposure control circuit apparatus adapted for detecting signal level of average luminance signal obtained after image pick-up signal is caused to undergo luminance detection to control the exposure time on the basis of the detected signal level, comprising: light quantity detecting means for detecting a divisional region to which the signal level of the average luminance signal belongs of a large number of divisional regions obtained by dividing the range between the maximum level and the minimum level; response speed setting means adapted to set the degree of change of response speed in dependency upon an output of the light quantity detecting means and such that in the case where at least the signal level of the average luminance signal belongs to the region including the maximum level or the region including the minimum level and that signal level is continuously inputted for a predetermined time, the response speed setting means sets the degree of change of the response speed to a larger value; and exposure time control means for varying the exposure time on the basis of response speed set at the response speed setting means. Accordingly, momentary change of luminance level can be equivalently disregarded. In addition, with respect to change of luminance level which is not momentary, response of iris can be faster according as the level change becomes greater. Thus, iris response closer to that of the eye of the human being can be realized.

What is claimed is:

1. An exposure control circuit apparatus adapted for detecting a signal level of an average luminance signal obtained after an image pick-up signal from a solid-state image pick-up device is caused to undergo luminance detection to control exposure time on the basis of the detected signal level, comprising:

light detecting means for detecting which of a plurality of divisional regions the signal level of the average luminance signal falls within, said divisional regions being obtained by dividing the range between the maximum level and the minimum level of the signal level of the average luminance signal;

speed setting means for setting an amount of change of response speed of said pick-up device in dependency upon an output of said light detecting means when the level of the average luminance signal falls within a first region which includes the maximum level or a second region which includes the minimum level, said speed setting means setting the amount of change of the response speed to a predetermined larger value depending on the length of time over which said output from said light detecting means remains within said first region or said second region during a predetermined number of continuous fields; and time control means for changing the exposure time of said solid-state image pick-up device on the basis of the response speed set at the speed setting means.

2. An exposure control circuit apparatus as set forth in claim 1, wherein the image pick-up signal comprises charges which are stored at a plurality of pixels of a solid-state image pick-up device, said charges being read out into a charge transfer section upon application of a readout pulse, and are sequentially transferred by the charge transfer section; and wherein the exposure control means includes means for controlling the exposure time at respective pixels of the solid-state image pick-up device by applying to the solid-state image pick-up device a shutter pulse for discharging signal charges stored at respective pixels of the solid-state image pick-up device.

3. An exposure control circuit apparatus as set forth in claim 2, wherein the light detecting means includes a plurality of comparators for comparing comparison reference levels which differ from each other with the level of the average luminance signal; and wherein the speed setting means includes:

detecting means for detecting information relating to the divisional regions on the basis of outputs from the plurality of comparators;

information holding means for taking thereinto at predetermined intervals information relating to the divisional region detected at the detecting means to hold it for a predetermined period;

maximum level detecting means such that when information relating to the divisional region held at the information holding means belongs to the region including the maximum level, a set operation is carried out, and when said set operation is repeatedly and continuously carried out a predetermined number of times, on output signal is outputted;

minimum level detecting means such that when information relating to the divisional region held at the information holding means belongs to the region including the minimum level, a set operation is carried out, and when set operations are continuously carried out a predetermined number of times, an output signal is outputted; and adding/subtracting means adapted for setting the amount of change of response speed obtained from the information held at the information holding means to a larger predetermined value on the basis of said signals output by the maximum level detecting means and the minimum level detecting means.

4. An exposure circuit apparatus as set forth in claim 3, wherein the information holding means takes thereinto information relating to the divisional information detected at the detecting means every input of the readout pulse to hold it for a time period corresponding to the pulse period of the readout pulse.

5. An exposure control circuit apparatus as set forth in claim 4, wherein the maximum level detecting means and the minimum level detecting means are of a multi-stage structure including flip-flop circuits of the number of stages obtained by subtracting one from the predetermined number of times, said predetermined number of times being the number of set operations.

6. An exposure control circuit apparatus as set forth in claim 1 wherein the light quantity detecting means includes a plurality of comparators which compare said average luminance signal to a plurality of predetermined threshold levels of successively decreasing magnitude and output a corresponding number of digital data bits in parallel which are indicative of said average luminance signal at a particular frame; and wherein said response speed setting means includes a decoder having a number of inputs corresponding to the number of said comparators and a corresponding number of outputs which provides a digital output indicative of the magnitude of the luminance signal;

a latch for receiving the digital output from said decoder, said latch selectively outputting said digital output in response to a periodic clock signal;

a plurality of flip flops provided in a number of series arrangements, each series arrangement receiving a portion of said digital output from said latch and determining whether each said portion is continuously repeated over a fixed number of successive occurrences of said periodic clock signal;

an adding and subtracting circuit for receiving said digital output from said latch through said plurality of flip flops and providing a shutter control response speed signal which is adjusted in accordance with said digital output, whereby a greater predetermined amount of change in shutter control response is provided when said average luminance signal remains excessively low or excessively high for said fixed number of successive occurrences of said periodic clock signal and a lesser predetermined amount of change in shutter control response is provided when said average luminance signal is excessively low or excessively high for fewer than said fixed number of occurrences of said periodic clock signal.

7. A circuit apparatus for controlling the exposure of a solid-state image pick-up device, comprising:

means for providing an average luminance signal indicative of the average luminance of an image projected on said solid-state image pick-up device;

a luminance detection circuit which compares said average luminance signal to a plurality of predetermined threshold levels of successively decreasing magnitude and outputs a corresponding number of digital data bits in parallel which are indicative of the luminance of said image at a particular frame;

a response speed setting circuit which determines the speed by which the exposure of said solid-state image pick-up device is to be adjusted, said response speed setting circuit determining both the relative level of luminance of the image of projected onto said solid-sate image pick-up device and the degree said relative level of luminance fluctuates over successive frames, and outputting a response speed signal based thereon; and an exposure control circuit which varies the time to which said solid-state image-control device is exposed to said image by varying the discharge time of said solid-state image pick-up device in response to said response speed signal so that a greater predetermined amount of change of the image pick-up control response is provided when said average luminance signal remains excessively low or excessively high over for a larger number of fields than a predetermined number of continuous fields and a lesser predetermined amount of change of the image pick-up control response is provided when said average luminance signal remains excessively low or excessively high for a smaller number of fields than said predetermined number of continuous fields.

8. The circuit apparatus according to claims 7 wherein said luminance detection circuit includes a plurality of comparators in a number corresponding to the number of said digital data bits.

9. The circuit apparatus according to claim 8 wherein said response speed setting circuit comprises:

a decoder having a number of inputs corresponding to the number of said comparators and a corresponding number of outputs which provides a digital output indicative of the magnitude of the luminance signal;

a latch for receiving the digital output from said decoder, said latch selectively outputting said digital output in response to a periodic clock signal;

a plurality of flip flops provided in a number of series arrangements, each series arrangement receiving a portion of said digital output from said latch and determining whether each said portion is continuously repeated over a fixed number of successive occurrences of said periodic clock signal;

an adding and subtracting circuit for receiving said digital output from said latch through said plurality of flip flops and providing a response speed signal which is adjusted in accordance with said digital output, whereby a greater predetermined amount of adjustment in shutter control response is provided when said average luminance signal remains excessively low or excessively high for said fixed number of successive occurrences of said periodic clock signal and a lesser predetermined amount of adjustment in shutter control response is provided when said average luminance signal is excessively low or excessively high for fewer than said fixed number of occurrences of said periodic clock signal.

10. An exposure control circuit apparatus adapted for detecting a signal level of an average luminance signal obtained after an image pick-up signal from a solid-state image pick-up device is caused to undergo luminance detection to control exposure time on the basis of the detected signal level, comprising:

light detecting means for detecting which of a plurality of divisional regions the signal level of the average luminance signal falls within, the divisional regions being obtained by dividing the range between the maximum level and the minimum level of the signal level of the average luminance signal, the divisional regions including a first region that includes the maximum level and a second region that includes the minimum level;

exposure control means for varying the time during which the solid-state image pick-up device is exposed by varying the discharge time of the solid-state image pick-up device; and speed setting means for setting a predetermined amount of change of response speed of the pick-up device in dependency upon an output of the light detecting means when the level of the average luminance signal falls within the first region or the second region, the speed setting means increasing said predetermined amount of change of the response speed depending on the length of time over which the output from the light detecting means remains within the first region or the second region during a predetermined number of continuous fields.

11. An exposure control circuit apparatus as set forth in claim 10, wherein the image pick-up signal comprises charges which are stored at a plurality of pixels of the solid-state image pick-up device, the charges being read out into a charge transfer section upon application of a readout pulse, and being sequentially transferred by the charge transfer section.

12. An exposure control circuit apparatus as set forth in claim 11, wherein the exposure control means includes means for controlling the exposure time at respective pixels of the solid-state image pick-up device by applying to the solid-state image pick-up device a shutter pulse for discharging signal charges stored at respective pixels of the solid-state image pick-up device.

13. An exposure control apparatus as set forth in claim 10, wherein the light detecting means includes a plurality of comparators for comparing reference levels of different magnitudes with the level of the average luminance signal.

14. An exposure control apparatus as set forth in claim 13, wherein the speed setting means includes:

means for providing information indicating the divisional region in which the average luminance signal falls on the basis of respective outputs from the plurality of comparators;

information holding means for receiving the information the means for providing information at predetermined intervals and holding the information for a predetermined period;

maximum level detecting means for counting continuous, successive periods in which the information remains in the first region and outputting a maximum level signal when the number of continuous, successive periods in which the information remains in the first region exceeds a predetermined limit;

minimum level detecting means for counting continuous, successive periods in which the information remains in the second region and outputting a minimum level signal when the number of continuous, successive periods in which the information remains in the second region exceeds a predetermined limit; and adding/subtracting means for increasing the amount of change of response speed to a larger predetermined value when receiving either the maximum level signal from the maximum level detecting means or the minimum level signal from the minimum level detecting means.

15. An exposure control apparatus as set forth in claim 14, wherein the maximum level detecting means and the minimum level detecting means comprise multi-stage structures including a plurality of flip-flop circuits in a number corresponding to one less than the predetermined limit.

16. An exposure control apparatus as set forth in claim 10, wherein the light detecting means includes a plurality of comparators which compare the level of the average luminance signal to a plurality of predetermined threshold levels of successively decreasing magnitude and output a corresponding number of digital data bits in parallel which are indicative of the average luminance signals at a particular frame.

17. An exposure control apparatus as set forth in claim 16, wherein the response setting means includes:

a decoder having a plurality of inputs and a plurality of outputs in a number corresponding to the number of the comparators, the decoder providing a digital output indicative of the magnitude of the luminance signal;

a latch for receiving the digital output from the decoder, the latch selectively outputting the digital output in response to a periodic clock signal;

a plurality of flip flops provided in a number of series arrangements, each series arrangement receiving a portion of the digital output from the latch and determining whether each said portion is continuously repeated over a fixed number of successive occurrences of the periodic clock signal;

an adding and subtracting circuit for receiving the digital output from the latch through the plurality of flip flops and providing a shutter control response speed signal which is adjusted in accordance with the digital output, whereby a greater predetermined amount of change in shutter control response is provided when the average luminance signal remains excessively low or excessively high for the fixed number of successive occurrences of the periodic clock signal and a lesser predetermined amount of change in shutter control response is provided when the average luminance signal is excessively low or excessively high for fewer than the fixed number of occurrences of the periodic clock signal.

* * * * *